Figures 1, 2, 3:
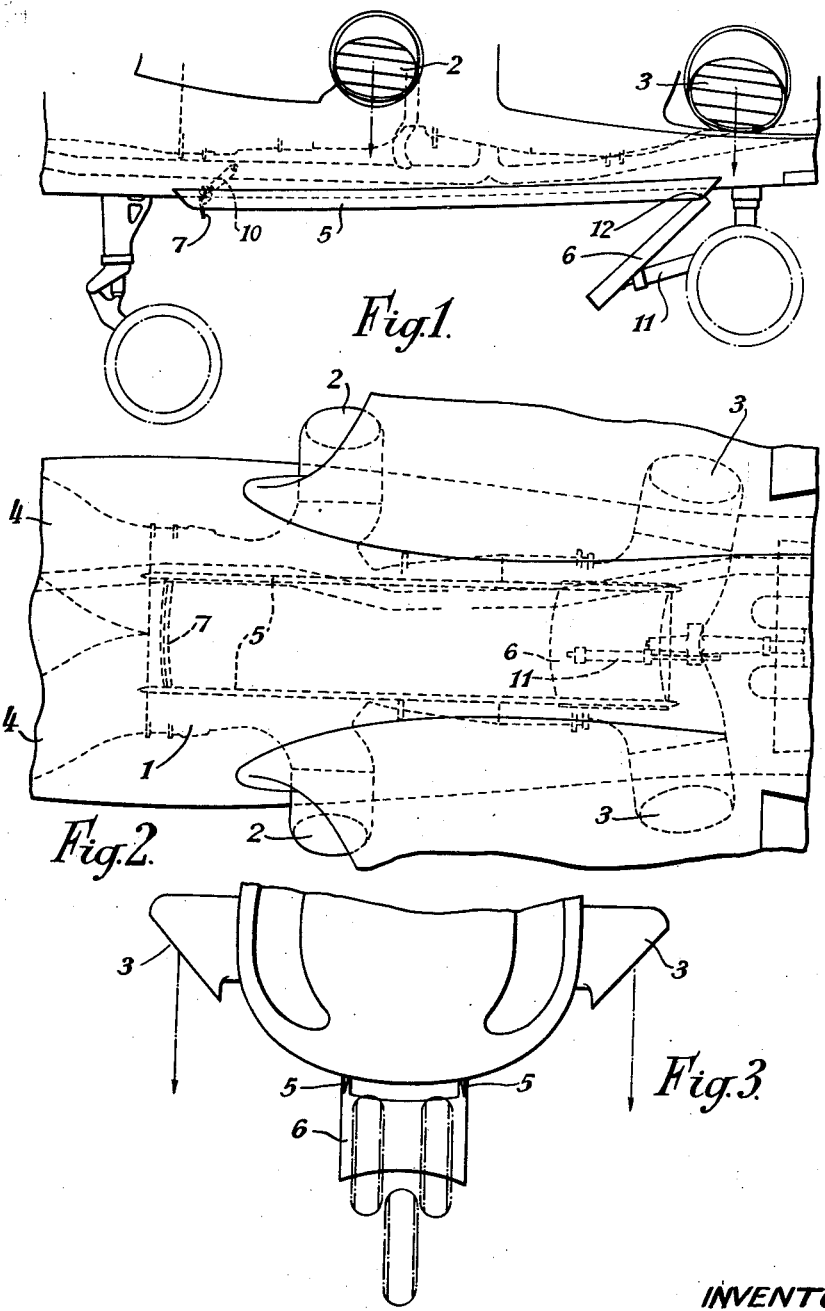

INVENTOR
Robert Bulkeley Marsh
BY
Stevens Davis Miller & Mosher
ATTORNEY

Jan. 15, 1963  R. B. MARSH  3,073,548
VTOL AIRCRAFT WITH GAS DIVERSION MEANS
Filed Jan. 23, 1961  2 Sheets-Sheet 2
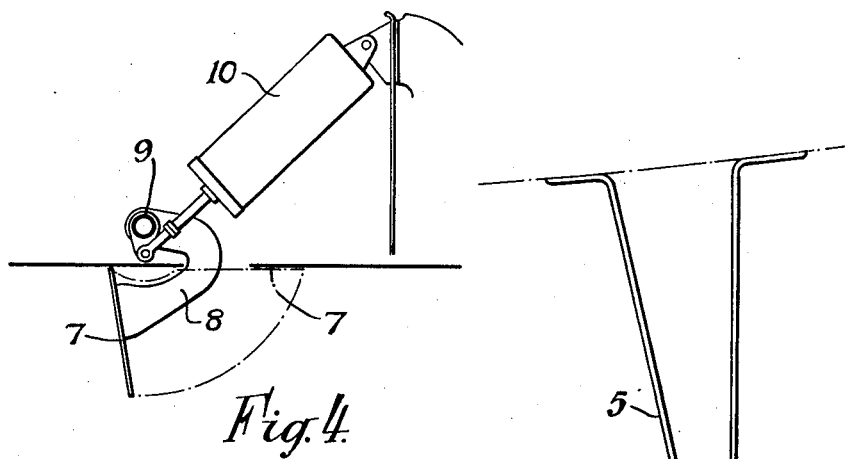
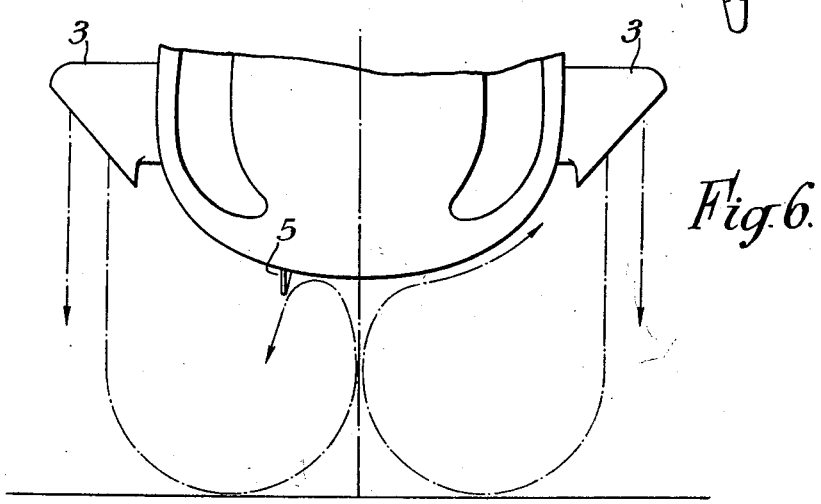
INVENTOR
Robert Bulkley Marsh
BY
Stevens Davis Miller & Mosher
ATTORNEY

United States Patent Office 3,073,548
Patented Jan. 15, 1963

3,073,548
VTOL AIRCRAFT WITH GAS DIVERSION MEANS
Robert Bulkeley Marsh, East Horsley, England, assignor to Hawker Aircraft Limited, Kingston-upon-Thames, England
Filed Jan. 23, 1961, Ser. No. 84,276
Claims priority, application Great Britain Jan. 22, 1960
6 Claims. (Cl. 244—12)

This invention relates to aircraft of "the vertical takeoff and landing type," the phrase being intended to cover aircraft which are capable of taking off and landing vertically or alterntaively taking off and landing at a speed below stalling speed, the upward lift being obtained by jets directed substantially vertically downward towards the ground, or in the case of a rotary wing aircraft, by means of one or more lift rotors. The invention is therefore to a certain extent applicable to rotary wing aircraft but is particularly applicable to aircraft of the fixed wing or wingless type wherein upward lift is obtained solely or partly by the reaction of downwardly directed jets. An example of such an aircraft forms the subject of co-pending patent application No. 843,302.

When two or more jets are directed substantially vertically downward so that they engage the ground, the gases must spread in all horizontal directions near the ground. This induces a considerable downward flow in the air near the body to which the jet nozzles are attached which in turn exerts a downward force on the body. This phenomena is generally known as "the ground suction effect" and although present to a certain extent in aircraft of the rotary wing type employing a lifting rotor, is particularly prominent where the lifting effect is obtained by means of high speed downwardly directed jets.

When there are two or more such jets, arranged for example on opposite sides of the body, some of the spreading gases must meet in a central region and rise towards the body. These gases will then follow the body contours until they escape upwardly, for example between the originating jet nozzles in the case of an aircraft having jet nozzles spaced apart fore and aft on opposite sides of the body. The gases also interfere with the free flow of air into the air intake openings of the gas turbine or turbines.

With the primary object of reducing the "ground suction effect" it is proposed in accordance with the invention to so arrange the body contour or provide the body with fences or projections which will intercept or interfere with the flow of gases upwardly of the body contours, the gases which would normally have passed over the body in an upward direction being directed outwards, and downwards.

Such an arrangement is found to overcome, or vary materially overcome, the "ground suction effect" as the pressure beneath the body is materially increased.

Although it is within the scope of the present invention to form the body, for example a fuselage or pod, with a recess in its undersurface into which the gases deflected from the ground can enter, it is proposed in the ensuing description to overcome the "ground suction effect" by the provision of fences or projections on the body which will have the effect of diverting the upwardly directed gases outwardly and downwardly from the body.

The fences may for example take the form of longitudinally arranged strakes carried by the body and directly downwardly and/or outwardly so that they will not interfere with the downward flow of the gases but will intercept a considerable proportion of the volume of gases which are deflected upwardly from the surface of the ground.

The longitudinal strakes may be joined at their ends by transverse strakes and all or some of the strakes may be retractible if necessary so as not to interfere with forward flight.

The transverse strakes may in fact be used as air-brakes if desired.

It will be appreciated that the strakes may in fact have an additional function. They may for example, form bomb bay doors, undercarriage doors or the like, provided they are so positioned and dimensioned as to give the effect desired.

The effective depth and/or angular positioning of the fences may be adjustable to suit various flight conditions and in addition to the use of the fences, the body may be specially constructed to assist in obtaining the desired effect.

Referring to the accompanying drawings:
FIGURE 1 is a fragmentary side elevation of a vertical take off and landing fixed wing aircraft fitted with strakes in accordance with the invention;
FIGURE 2 is a plan;
FIGURE 3 is a front elevation;
FIGURE 4 is a detail view showing the transverse baffle actuating mechanism;
FIGURE 5 is a section on an enlarged scale of one of the fixed strakes; and
FIGURE 6 is a diagram showing the direction of gas flow with and without strakes.

The aircraft shown is of the kind in which vertical lift is obtained from a gas turbine including one or more comparatively large diameter fans located within a fan casing 1 at the front of the engine, the fan casing having branch passages leading to a pair of nozzles 2 projecting from opposite sides of the fuselage and forward of the centre of gravity, the exhaust efflux gases passing to a bifurcated exhaust pipe leading to a second pair of nozzles 3 arranged aft of the centre of gravity.

Both pairs of nozzles are mounted for simultaneous orientation about their horizontal axes through an angle of substantially 100° from a position in which they project horizontally rearwardly to produce a forward thrust to a position in which they project downwards to produce a vertical lift.

The present invention is concerned with the flow of air and exhaust gases from the nozzles when they project downwardly to direct the gases onto the ground to produce a vertical lift and in the first case to prevent the indirect flow of air in an upward direction over the sides of the fuselage and the prevention of the hot gases from the aft nozzles entering the air intake openings 4 of the gas turbine.

The fuselage on its under surface is provided with a pair of downwardly projecting spaced strakes or fences 5, each strake preferably having the cross-sectional shape shown in FIGURE 5.

As will be seen clearly from FIGURES 1 and 2 these strakes project well forwardly of the front lift nozzles 2 and terminate at their rear ends at a point approximating to the horizontal axes of the rear lift nozzles 3. The strakes are fixed but may be retractible into the contour of the fuselage for forward flight.

The space separating the strakes at their rear ends is closed by the main undercarriage door 6, whilst at their front ends the space separating the strakes is closed by a transverse fence 7, the latter being carried by levers 8 pivoted at 9 and movable from an extended to a retracted position by an actuator 10.

The main undercarriage door 6 may be moved from a retracted to an extended position by means of an actuator 11, the door pivoting about axis 12 and when open occupying a forwardly inclined position shown in FIGURE 1, in which position it forms an air brake.

The strakes 5, transverse fence 7 and door 6 act together to increase the pressure recovery on the underside of the fuselage caused by the upflow of the four interacting lift jets when the aircraft is close to the ground.

The transverse fence 7 also acts when the aircraft is close to the ground to separate the forwardly flowing hot gases from the bottom of the fuselage, the fence acting as a baffle so that the gases will be deflected downwardly and forwardly thus preventing them entering the air intake openings 4 with consequence loss of thrust due to intake temperature rise.

It will be appreciated that with the help of the strakes 5, transverse fence 7 and door 6 will by increasing the pressure recovery on the underside of the fuselage very effectively reduce the "ground suction effect."

FIGURE 6 illustrates diagrammatically the flow of gases over the undersurface of an aircraft fuselage with the lift nozzles directed downwardly, the left half of the drawing showing the gas flow when strakes are fitted, the right half of the drawing showing the unrestricted upward flow of gases over the sides of the fuselage when no strakes are provided.

I claim:

1. In an aircraft of the fixed wing, vertical takeoff and landing type having a fuselage, nozzles on opposite sides of said fuselage, a gas turbine, and means to cause high speed gases from said gas turbine to flow through said nozzles, said nozzles being operable to direct said high speed gases vertically downward, said aircraft including air intake openings for supplying air to said gas turbines, the improvement comprising longitudinally arranged strakes on the under surface of said fuselage to intercept the upward flow of gases reflected upwardly from the ground and deflect them downwardly from the under surface of said fuselage, and transverse fences closing the space separating said strakes at their ends for preventing upward flow of the gases into said air intake openings.

2. In an aircraft as recited in claim 1, the further improvement comprising means for retracting the transverse fences.

3. A vertical takeoff aircraft comprising a fuselage, nozzle means operable to direct streams of high speed gases vertically downward on opposite sides of said fuselage, longitudinally arranged strakes on the under surface of said fuselage to intercept the upward flow of gases reflected upwardly from the ground and to deflect such gases downwardly from the under surface of said fuselage, and transverse fences closing the space separating said strakes at their ends.

4. An aircraft as recited in claim 3 wherein means are provided for retracting said transverse fences.

5. A vertical takeoff aircraft comprising fuselage, nozzle means operable to direct streams of high speed gases vertically downward on opposite sides of said fuselage, and means mounted on the under surface of said fuselage to intercept the upward flow of gases reflected upwardly from the ground and deflect such gases downwardly from the under surface of said fuselage.

6. A vertical takeoff aircraft as recited in claim 5 wherein said means mounted on the under surface of said fuselage comprises longitudinally arranged strakes.

References Cited in the file of this patent

UNITED STATES PATENTS

| | | |
|---|---|---|
| 2,749,064 | Kuhlman | June 5, 1956 |
| 2,936,972 | Zinavage | May 17, 1960 |